United States Patent
Martin et al.

(10) Patent No.: US 7,530,228 B2
(45) Date of Patent: *May 12, 2009

(54) INTEGRATED TURBOCHARGER LUBRICANT FILTER SYSTEM

(75) Inventors: Steve P. Martin, Walnut, CA (US); Christopher O Meade, Redondo Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 126 days.

This patent is subject to a terminal disclaimer.

(21) Appl. No.: 11/379,907

(22) Filed: Apr. 24, 2006

(65) Prior Publication Data

US 2006/0193734 A1 Aug. 31, 2006

Related U.S. Application Data

(63) Continuation of application No. 10/992,314, filed on Nov. 18, 2004, now Pat. No. 7,040,874.

(51) Int. Cl.
| | |
|---|---|
| F02B 33/44 | (2006.01) |
| F02B 39/14 | (2006.01) |
| F02B 39/00 | (2006.01) |
| F01M 11/03 | (2006.01) |
| F01M 11/10 | (2006.01) |
| F04B 17/00 | (2006.01) |
| F04B 35/00 | (2006.01) |
| F01M 1/10 | (2006.01) |
| F16K 31/06 | (2006.01) |
| F02M 37/02 | (2006.01) |

(52) U.S. Cl. .................. 60/605.3; 60/602; 417/407; 137/550; 137/544; 137/549; 184/6.24; 210/90

(58) Field of Classification Search .................. 60/602, 60/605.3; 417/406–409; 137/544, 549, 550; 415/122.1; 184/6.26, 6.24, 6.9; 210/90; F02B 39/14, F02B 39/00; F01M 11/03, 11/10
See application file for complete search history.

(56) References Cited

U.S. PATENT DOCUMENTS 2,828,907 A * 4/1958 Oehrli .................. 415/122.1
3,045,419 A 7/1962 Addie et al. ............... 60/605.3

(Continued)

FOREIGN PATENT DOCUMENTS

DE 2854762 A * 6/1980

(Continued)

OTHER PUBLICATIONS

Notification Of Transmittal Of The International Search Report And The Written Opinion Of The International Searching Authority, Or The Declaration.

*Primary Examiner*—Thai Ba Trieu
(74) *Attorney, Agent, or Firm*—Lee & Hayes, LLP.

(57) ABSTRACT

An exemplary center housing for a turbocharger includes a lubricant control valve that includes a stem seated at least partially in the center housing where the stem has one or more orifices for controlling lubricant flow. The exemplary center housing also includes a lubricant filter positioned adjacent the stem of the lubricant control valve. The lubricant filter is optionally replaceable, for example, being accessible by removal of the stem from the center housing. Various other exemplary devices, assemblies, systems, methods, etc., are also disclosed.

16 Claims, 7 Drawing Sheets

U.S. PATENT DOCUMENTS

| | | | |
|---|---|---|---|
| 3,090,544 A * | 5/1963 | Woollenweber, Jr. et al. | 184/6.16 |
| 3,490,735 A * | 1/1970 | Hansen et al. | 251/214 |
| 3,945,762 A * | 3/1976 | Leicht | 417/407 |
| 4,058,981 A | 11/1977 | Henson | 60/605.3 |
| 4,126,997 A | 11/1978 | Henson | 60/605.3 |
| 4,626,344 A | 12/1986 | Fick et al. | 210/90 |
| 5,000,143 A | 3/1991 | Brown | 184/6.18 |
| 5,169,524 A * | 12/1992 | Meiritz et al. | 210/232 |
| 5,239,861 A | 8/1993 | Fujita et al. | 73/61.73 |
| 5,499,693 A | 3/1996 | Widenhorn | 184/6.24 |
| 6,152,120 A | 11/2000 | Julazadeh | 123/572 |
| 6,212,889 B1 * | 4/2001 | Martin | 60/602 |
| 6,269,642 B1 * | 8/2001 | Arnold et al. | 60/602 |
| 6,475,255 B1 | 11/2002 | Walker, Jr. | 55/315 |
| 6,652,740 B2 | 11/2003 | Schoess | 210/90 |
| 6,679,057 B2 * | 1/2004 | Arnold | 60/602 |
| 6,848,404 B2 * | 2/2005 | Maeyama et al. | 137/545 |
| 6,895,751 B1 * | 5/2005 | Greentree | 60/602 |
| 6,994,796 B2 * | 2/2006 | Wall | 210/791 |
| 7,000,633 B2 * | 2/2006 | Okada et al. | 137/550 |
| 2007/0110349 A1 * | 5/2007 | Groves | 384/368 |

FOREIGN PATENT DOCUMENTS

| | | |
|---|---|---|
| JP | 58015721 | 7/1981 |
| JP | 62003115 | 6/1985 |
| JP | 62003116 | 6/1985 |
| JP | 06212989 | 8/1994 |
| WO | WO9114083 | 9/1991 |
| WO | WO0238248 | 5/2002 |

* cited by examiner

EXEMPLARY VARIABLE GEOMETRY TURBINE
CENTER HOUSING WITH OIL CONTROL VALVE

INTEGRATED TURBOCHARGER LUBRICANT FILTER SYSTEM

RELATED APPLICATIONS

This application is a continuation of U.S. patent application having Ser. No. 10/992,314, filed Nov. 18, 2004, entitled "Integrated Turbocharger Lubricant Filter System", now U.S. Pat. No. 7,040,874 B1, which is incorporated by reference herein.

TECHNICAL FIELD

Subject matter disclosed herein relates generally to turbomachinery for internal combustion engines and, in particular, lubricant filter systems for filtering lubricant for rotating turbomachinery shafts.

BACKGROUND

Most turbomachinery include a shaft that extends from a hub of a turbine wheel to a shaft bearing. For example, turbines for internal combustion engines typically include a turbine wheel housing that directs exhaust of an engine to a turbine wheel and another housing that houses a bearing for a shaft coupled to the turbine wheel. In such an arrangement, the bearing exists in a lubricant environment that lubricates the bearing to reduce frictional forces, dampen vibration, etc., to thereby allow for high speed operation of the turbine. Contamination of the lubricant by particulates or break-down of the lubricant or components thereof can result in a shortened bearing life or bearing failure. Of course, damage may occur to other components of a turbocharger as well. Consequently, a need exists for technology that can filter contaminated lubricant.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein.

DETAILED DESCRIPTION

Various exemplary methods, devices, systems, arrangements, etc., disclosed herein address issues related to technology associated with turbochargers.

Figure 1:
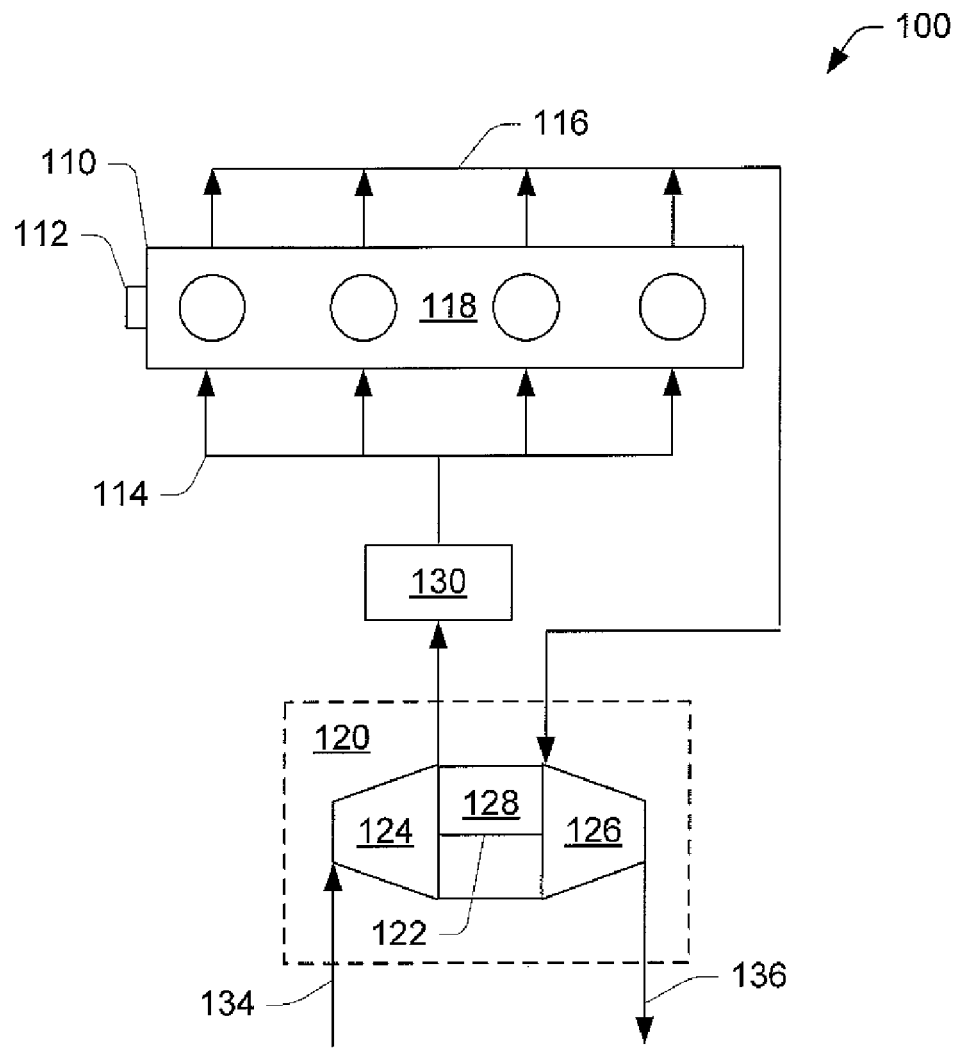
FIG. 1 is a diagram of a conventional turbocharger and internal combustion engine.

Turbochargers are frequently utilized to increase the output of an internal combustion engine. Referring to FIG. 1, a prior art system 100, including an internal combustion engine 110 and a turbocharger 120 is shown. The internal combustion engine 110 includes an engine block 118 housing one or more combustion chambers that operatively drive a shaft 112. As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126.

The output of the compressor 124 flows to a heat exchanger (e.g., cooler) 130 that is typically used to extract heat from the compressed intake air prior to the intake port 114 of the engine 110. As mentioned in the Background section, compression causes friction between air molecules and hence frictional heating. Thus, air at a compressor outlet generally has a considerably higher temperature than air at a compressor inlet. In FIG. 1, the heat exchanger 130 is typically an intercooler that acts to remove heat from compressed air before the compressed air reaches one or more combustion chambers of the engine 110.

Figure 7A:
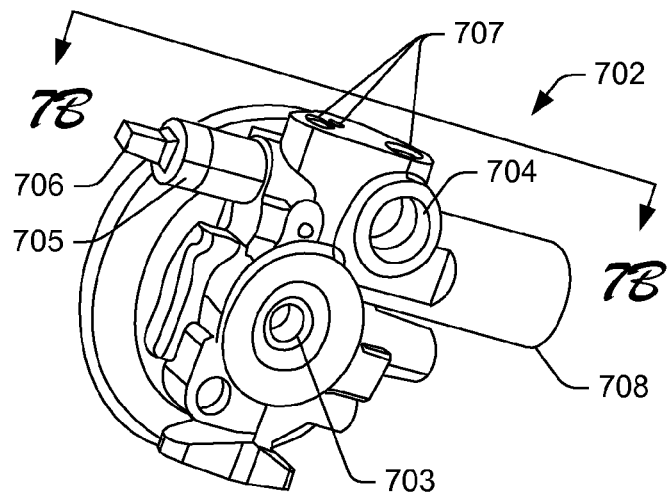
FIG. 7A is a perspective view of an exemplary center housing for a variable geometry turbine that includes an oil control valve.
Figure 7B:
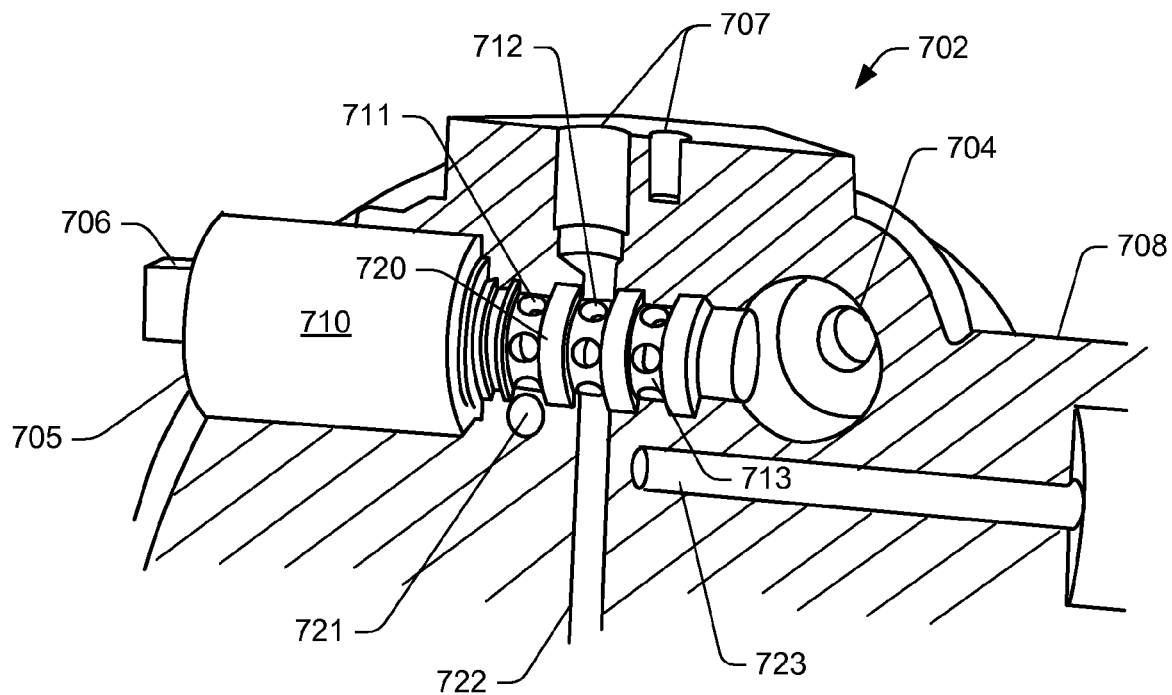
FIG. 7B is a cutaway view of the exemplary center housing of FIG. 7A that shows an exemplary oil control valve.
Figure 8:
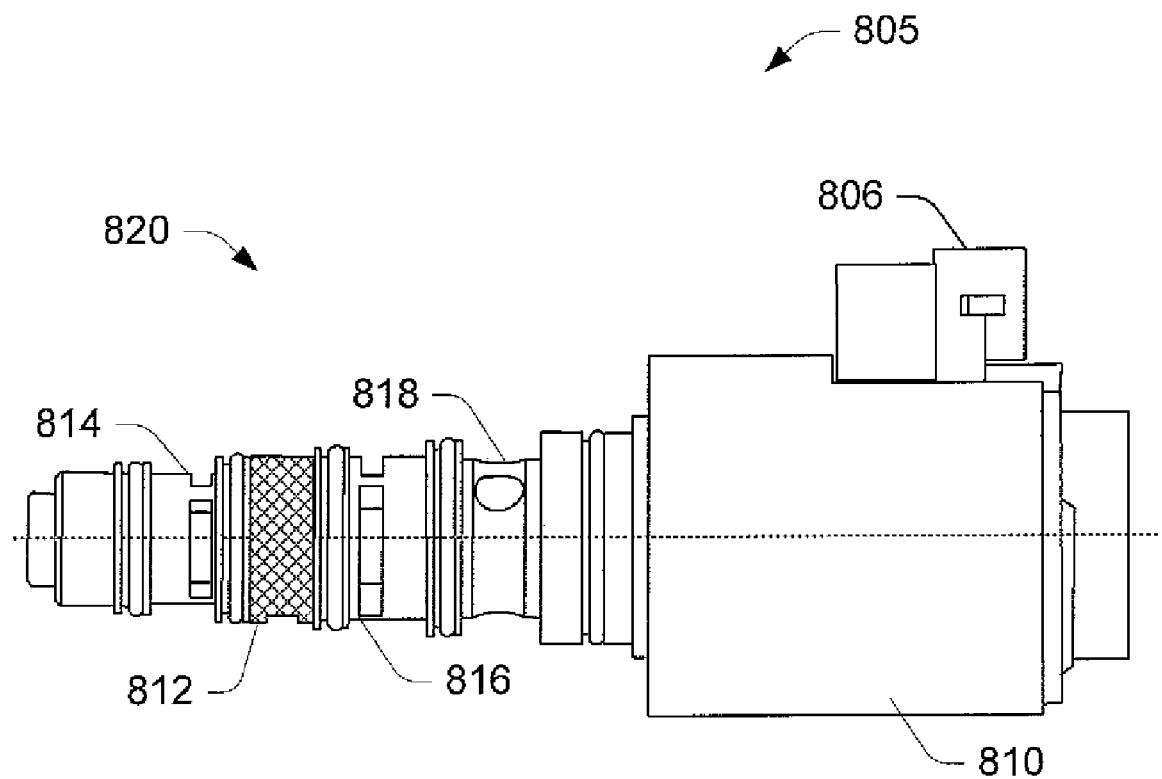
FIG. 8 is a side view of an oil control valve fitted with a filter.

Referring to the turbine 126, such a turbine optionally includes a variable geometry unit and a variable geometry controller. Various exemplary filtration devices or systems presented herein are not limited to variable geometry turbines, for example, such devices or systems may be used with (or be part of) fixed geometry turbines, wastegated turbines, free floating turbochargers, etc. The variable geometry unit and variable geometry controller optionally include features such as those associated with commercially available variable geometry turbochargers (VGTs), such as, but not limited to, the GARRETT® VNT™ and AVNT™ turbochargers, which use multiple adjustable vanes to control the flow of exhaust across a turbine. FIGS. 7A, 7B and 8, described further below, show various components that may be used in a variable geometry turbocharger. Of course, an exemplary turbocharger may employ wastegate technology as an alternative or in addition to variable geometry technology.

Figure 2:
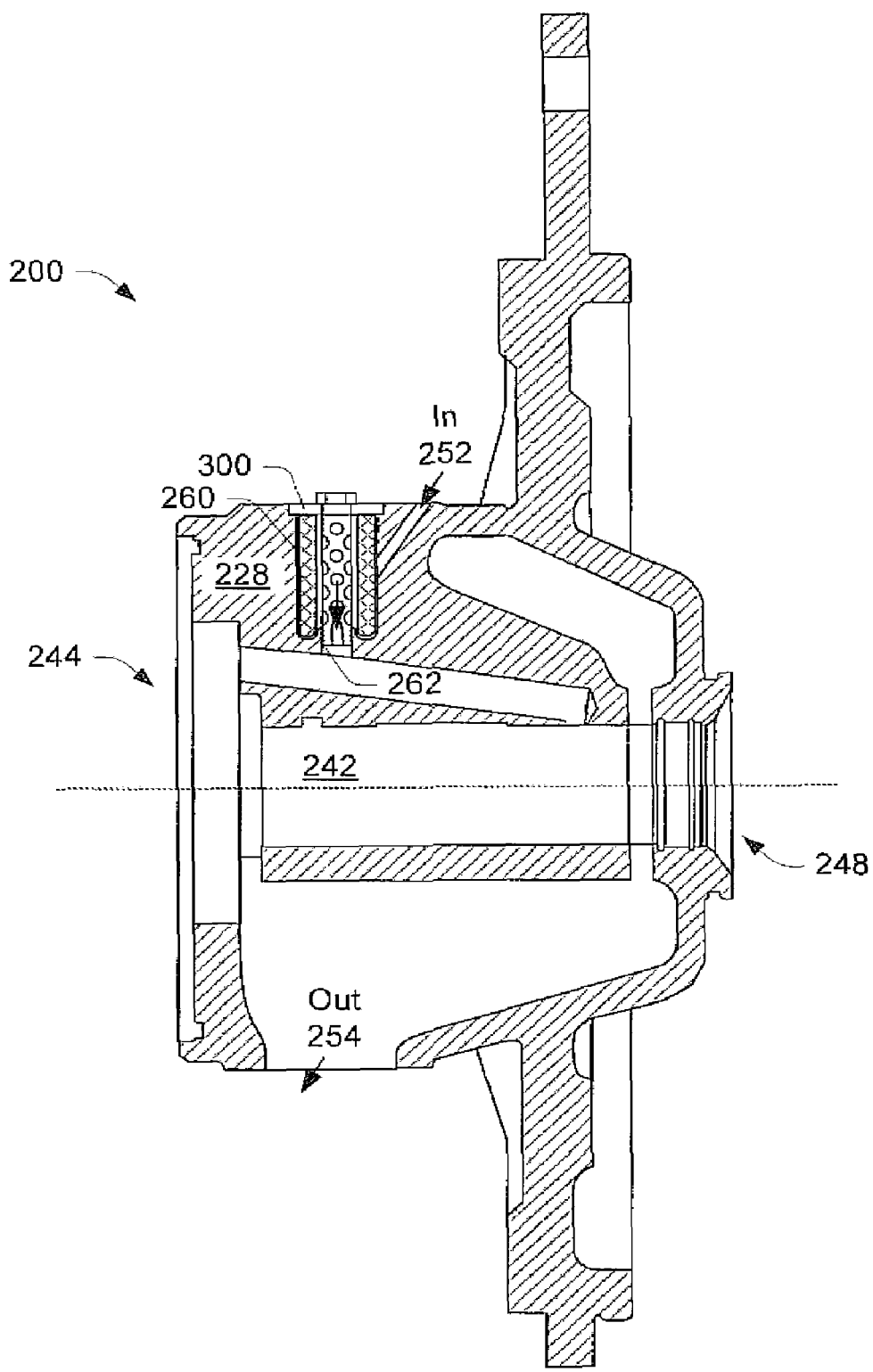
FIG. 2 is a cross-sectional view of an exemplary housing of a turbocharger that includes an exemplary filter unit.

FIG. 2 shows a cross-section of an exemplary assembly 200 that includes a housing 228 for housing a bearing to support a turbine wheel shaft. The exemplary housing 228 is optionally suitable for use as the housing 128 of FIG. 1. The exemplary housing 228 includes a through bore 242 that includes a compressor bore end 244 and a turbine bore end 248. In general, such a through bore has a longitudinal axis that is coaxial with the axis of rotation of a turbine wheel and a compressor wheel.

The housing 228 allows for lubrication of a bearing supported in the bore 242. Lubricant enters through an inlet 252 and exits through an outlet 254. In this example, the inlet 252 provides passage to a filter unit 300, which is described in more detail below with respect to FIGS. 3A and 3B. The filter unit 300 seats in a filter well 260 of the housing 228 of FIG. 2. In this example, the center housing 228 includes a feature 262 that cooperates with a feature of the filter unit 300 to allow for attachment of the filter unit 300 to the center housing 228.

Figure 3A:
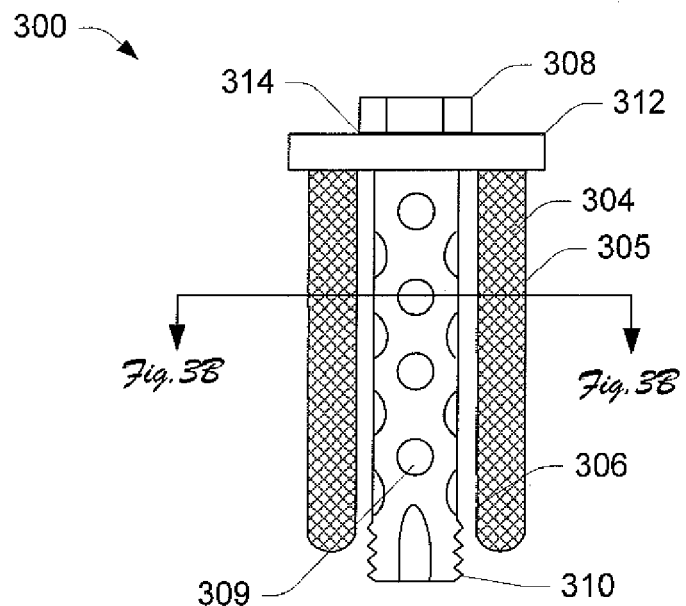
FIG. 3A is a cross-sectional view of an exemplary filter unit suitable for use with the exemplary housing of FIG. 2.

FIG. 3A shows the exemplary filter unit 300 of FIG. 2. The filter unit 300 includes a filter 304, an attachment mechanism (see, e.g., bolt 308) and a cap 312. The filter 304 may be substantially annular in shape or be of a shape that matches a filter well of an associated center housing. In the example of FIG. 3A, the attachment mechanism is a bolt 308 that includes perforations 309 and threads 310, which secures the filter 304 in a filter well of a center housing. In the example of FIG. 3A, the bolt 308 passes through an aperture 314 in the cap 312 and extends beyond the length of the filter 304. As shown in FIG. 2, the portion of the bolt 308 that extends beyond the filter 304 couples with matching threads 262 in a lubricant passage at the lower portion of the well 260. The lubricant passage allows filtered lubricant to pass to the bore 242. Thus, the filter unit 300 operates to filter lubricant that enters the housing 228 of FIG. 2 through the inlet 252 and then allows filtered lubricant to pass to the bore 242 of the housing.

Figure 3B:
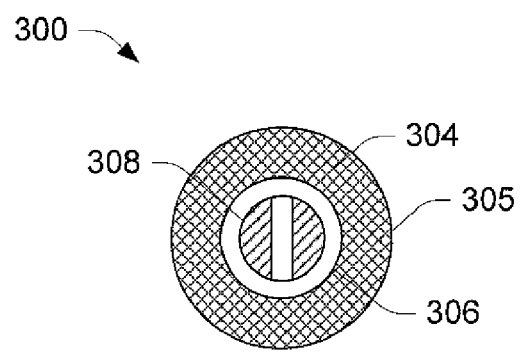
FIG. 3B is a cross-sectional view of the exemplary filter unit taken along line 3B-3B of FIG. 3A.

Various exemplary filter units include an attachment mechanism to attach the filter unit to the center housing, a filter for filtering lubricant and a lubricant flow path wherein the lubricant flow path commences at a peripheral surface of the filter unit, passes through the filter and ends at a bore surface of the filter unit. In the example of FIGS. 2, 3A and 3B, the filter 304 and hence, the filter unit 300, includes a peripheral surface 305 and a bore surface 306.

FIG. 3B shows a cross-section of the exemplary filter unit 300 of FIG. 3A. FIG. 3B shows an annular filter 304 that surrounds a perforated bolt 308. While a perforated bolt is shown as the attachment mechanism 308, alternative attachment mechanisms may be used. FIG. 3B also shows the peripheral surface 305 and the bore surface 306. In general, a center housing includes a feature that cooperates with the attachment mechanism of an exemplary filter unit, for example, consider the feature 262 of the center housing 228 of FIG. 2. In various other examples, a compression fit may allow for attachment, which would require a center housing to have an appropriately shaped filter well, etc.

The filter 304 is optionally replaceable as necessary, at separate service intervals or during engine oil change service intervals. For example, upon disengaging the bolt 308 from the housing 228 of FIG. 2, the filter 304 is accessible, removable and may be replaced with an unused filter, a cleaned filter or otherwise refurbished filter. As described herein, an exemplary filter unit or an exemplary filter may be replaceable or removable.

A pressure monitor is optionally used to determine when to check, remove, clean, replace, etc., a filter. Such a pressure monitor is separate or integrated into the filter unit. For example, the inlet 252 optionally includes a manometer type circuit that can indicate when the pressure drop across the filter 304 of the filter unit 300 increases beyond an acceptable level. In various other examples, a piezoelectric circuit may be used to indicate pressure. Further, a pressure sensor may optionally transmit a signal to an engine control unit. The signal may be used in conjunction with control logic to determine operating parameters of an engine, a turbocharger, etc.

The exemplary filter unit of FIGS. 2, 3A and 3B includes a male feature (e.g., threaded post, bayonet post, etc.) to affix the unit to the center housing, which includes a corresponding female feature. In other examples, an exemplary filter unit may include a female feature and the center housing may include a male feature to affix the filter unit to the center housing. Further, while the exemplary filter unit of FIGS. 2, 3A and 3B seats substantially in a well of the center housing, an exemplary filter unit may, alternatively, reside substantially adjacent to an exterior surface of a center housing. In the latter example, a portion of the filter unit may optionally extend into a well or channel of the center housing or a portion of the center housing (or component associated therewith) may extend outward from the center housing and cooperate with the filter unit.

Figure 4:
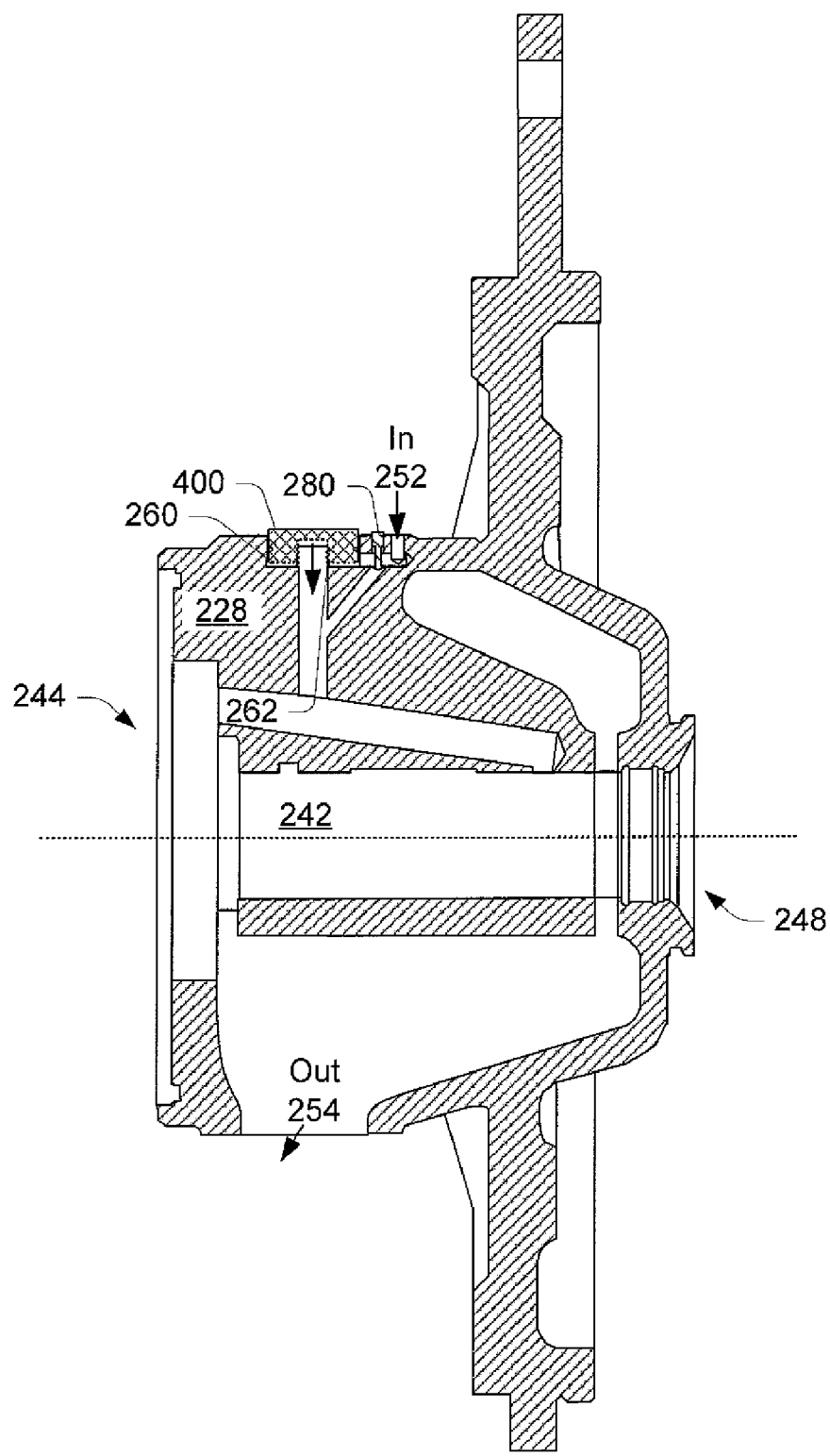
FIG. 4 is a cross-sectional view of an exemplary housing of a turbocharger that includes an exemplary filter unit.

FIG. 4 shows a cross-section of another exemplary assembly 204 that includes a housing 228 for housing a bearing to support a turbine wheel shaft. The exemplary housing 228 is optionally suitable for use as the housing 128 of FIG. 1. The exemplary housing 228 includes a through bore 242 that includes a compressor bore end 244 and a turbine bore end 248. In general, such a through bore has a longitudinal axis that is coaxial with the axis of rotation of a turbine wheel and a compressor wheel.

The housing 228 allows for lubrication of a bearing supported in the bore 242. Lubricant enters through an inlet 252 and exits through an outlet 254. In this example, the inlet 252 provides passage to a filter unit 400, which is described in more detail below with respect to FIGS. 5A and 5B. The filter unit 400 seats in a filter well 260 of the housing 228 of FIG. 4. In this example, the center housing 228 includes a feature 262 that cooperates with a feature of the filter unit 400 to allow for attachment of the filter unit 400 to the center housing 228.

Also shown in FIG. 4 is an optional filter bypass feature that includes a valve 280 that includes a plunger that may open to allow lubricant to flow to the bore 242 in instances where the pressure drop across the filter exceeds a certain limit. Such a feature acts to ensure that the bearing receives lubricant in the instance that fouling of the filter may jeopardize bearing lubrication.

Figure 5A:
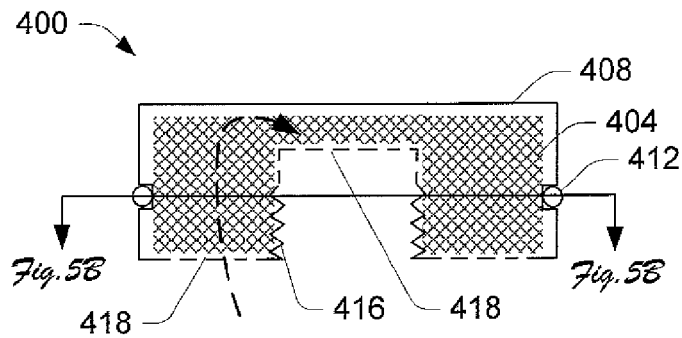
FIG. 5A is a cross-sectional view of an exemplary filter unit suitable for use with the exemplary housing of FIG. 4.

FIG. 5A shows the exemplary filter unit 400 of FIG. 4. The filter unit 400 includes a filter 404, a filter case 408, a seal 412 (e.g., an o-ring, etc.) and threads 416 that cooperate with the feature 262 of the center housing 228 of FIG. 4. In this example, the filter case 408 includes perforations in a lower surface 418 and perforations in a surface above the threads 416. A thick dashed arrow indicates a flow path for lubricant through the filter unit 400. Lubricant enters the filter unit 400 through perforations in the lower surface 418, passes through the filter 404 and then exits the filter unit 400 through perforations in a surface above the threads 416. The filter case 408 may include a slot on an upper surface to facilitate rotation of the filter unit 400 and hence the threads 416 to thereby allow for attachment and/or removal of the filter unit 400 to or from a housing such as the housing 228 of FIG. 4.

With respect to filters, an exemplary filter may be prepared with additives such that during use, the oil additives would be released over time, which may further the life of the filter. An exemplary filter (e.g., replaced at certain service intervals) may act to release oil additives that degrade during operation, especially turbocharger operation. In this example, turbocharger specific oil filter may be serviced more frequently than the engine oil.

With reference to FIG. 4, the exemplary filter unit 400 attaches to the housing 228 via the threads 416 and a matching set of threads 262 disposed in the housing 228, for example, in, or proximate to, the filter well 260 of the housing 228. The seal 412 acts to seal the lubricant in the filter well 260. Thus, the filter unit 400 operates to filter lubricant that enters the housing 228 through the inlet 252 and then allows filtered lubricant to pass to the bore 242 of the housing.

Figure 5B:
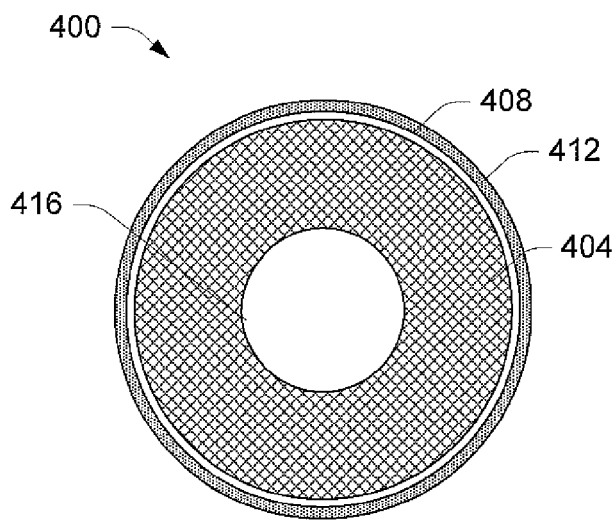
FIG. 5B is a cross-sectional view of the exemplary filter unit taken along line 5B-5B of FIG. 5A.

FIG. 5B shows a cross-section of the exemplary filter unit 400 of FIG. 5A. FIG. 5B shows an annular portion of the filter 404 that surrounds the threaded region 416. While threads are mentioned for attaching the filter unit 400 to the housing 228 of FIG. 4, other mechanisms may be used, for example, compression fit, bayonet, etc. Similarly, such other mechanisms may be used for the filter unit 300 to attach it to a center housing. The case 408 encases the filter 404 while the seal 412 seats in a slot of the case 408.

While the filter 404 may be optionally replaceable, the filter unit 400 as a whole may also be replaceable. Alternatively, it may be cleaned or otherwise refurbished.

A pressure monitor is optionally used to determine when to check, remove, clean, replace, etc., a filter. Such a pressure monitor is separate or integrated into the filter unit. For example, the inlet 252 optionally includes a manometer type circuit that can indicate when the pressure drop across the filter 404 of the filter unit 400 increases beyond an acceptable level. In various other examples, a piezoelectric circuit may be used to indicate pressure. Further, a pressure sensor may optionally transmit a signal to an engine control unit. The signal may be used in conjunction with control logic to determine operating parameters of an engine, a turbocharger, etc.

As already mentioned, any of a variety of mechanisms may be used to affix an exemplary filter unit to a center housing. While the exemplary unit 400 included recessed threads (i.e., a female feature), in various other examples, a filter unit may include a threaded external surface (i.e., a male feature).

Figure 6:
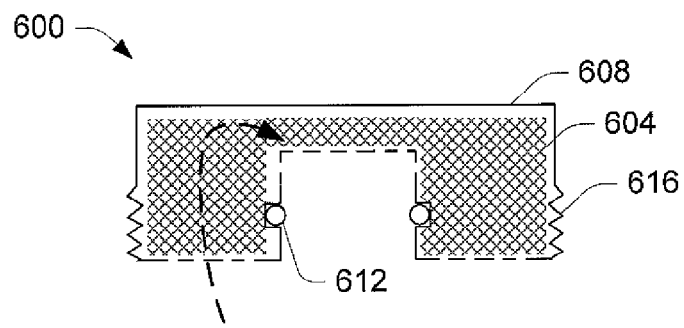
FIG. 6 is a cross-sectional view of an exemplary filter unit.

FIG. 6 shows an exemplary filter unit 600 for attachment to a center housing of a turbocharger. A thick dashed arrow indicates a flow path for lubricant. The filer unit 600 includes a case 608 that encases a filter 604. The case 608 includes threads 616 and a seal 612. The overall operation of the exemplary filter unit 600 is similar to that of the exemplary filter unit 400 of FIGS. 4, 5A and 5B; however, locations of the seal and threads are reversed. In the example of FIG. 6, the seat 612 (e.g., o-ring, etc.) is located to seal filtered lubricant from unfiltered lubricant whereas in the examples of FIGS. 4, 5A and 5B, the seal 412 is located to seal unfiltered lubricant from the external environment of the housing 228 of FIG. 4.

A center housing that corresponds to the filter unit 600 of FIG. 6 includes a filter well with threads that receive the threads 616. Of course, other attachment mechanism or mechanisms may be used. Yet further, various exemplary filter units may include more than one seal. For example, the exemplary filter unit 600 may include an additional seal such as the seal of the filter unit 400 positioned above the threads 616. In another example, threads are located near the top of the case 608 and a seal located below the threads.

FIG. 7A shows a perspective view of an exemplary center housing 702 that includes an oil control valve. As shown, the oil control valve 705 includes a connector 706 for communication of information and/or power. Various features of the center housing 702 correspond to those described with respect to the center housing 128 of FIG. 1, for example, the housing 702 includes a bore or opening 703 for receiving a turbine shaft 122. The housing 702 further includes features for a variable geometry unit that may adjust flow to a turbine wheel. For example, the housing 702 includes a bore or opening 704 for receiving a rotatable crank shaft, various ports 707 for hydraulic fluid (which may be lubricating oil), and a casing 708 for a piston.

FIG. 7B shows a cutaway view of the exemplary center housing 702 of FIG. 7A. The oil control valve 705 includes an electric actuator 710 and a valve stem 720. The electric actuator 710 allows for control of the valve stem 720. As shown, the valve stem 720 includes various orifices capable of selectively controlling hydraulic fluid paths, which may be in communication with ports and/or conduits. In general, control of such paths determines hydraulic pressure experienced by a piston cased in the casing 708. In turn, movement of the piston causes movement of a shaft operably connected, directly or indirectly, to variable geometry elements (e.g., vanes, etc.) of a variable geometry unit.

As described herein, one or more of the ports 707 optionally include a filter to filter the hydraulic fluid (which may be a lubricant that also lubricates a shaft bearing). Such filters optionally have features as shown in FIG. 2 through FIG. 6.

FIG. 8 shows an exemplary oil control valve 805 that includes an electric actuator 810 and a stem 820. The actuator 810 includes a connector 806 while the stem 820 includes various ports 814, 816 and 818. In the example of FIG. 8, the inlet port is fitted with a screen 812, which filters fluid.

Referring to FIG. 7B, the cross-sectional view shows the valve stem 720 as including orifices 711, 712 and 713 and three associated paths 721, 722 and 723. The path 722 is to the bore 703 (see FIG. 7A) and the paths 721 and 723 are to control a piston in the piston casing 708. FIG. 8 shows the stem 820 of the actuator 810 where only the inlet port is fitted with the screen 812. Accordingly, in FIG. 7B the valve stem 720 may be fitted with a screen to filter lubricant to the orifices 712 to thereby filter lubricant to the paths 721, 722 and 723.

Various exemplary systems that include lubricant filters include a filter bypass feature, which is optionally integral with a housing, a filter unit, etc. In one example, a filter unit includes a spring that seats a valve whereby when the pressure exceeds a certain level (due to a filter pressure drop), the oil pressure overcomes the spring force and the lubricating oil bypasses the filter. Such a bypass mechanism may be housed in a center housing, attached to a center housing or in-line with a lubricant feed.

Various exemplary systems optionally rely on a separate in-line oil filter. Various exemplary systems optionally rely on a filter unit that can be attached to a turbocharger center housing (e.g., a spin-on unit). Various exemplary systems optionally rely on a filter unit integrated into a turbocharger center housing (e.g., fitted in a center housing cavity).

The various exemplary housings and filter units are generally intended for use with turbomachinery. For example, an exemplary turbocharger may include a filter seated at least partially in a center housing of the turbocharger for filtering lubricant for lubrication of a bearing. Such a turbocharger optionally includes a pressure sensor for sensing pressure to an inlet to the filter where the pressure sensor can indicate an end-of-life of the filter (e.g., an appropriate replacement time, service time, etc.). As described, an attachment mechanism typically allows for proper seating of the filter in the center housing where the attachment mechanism may allow for replacement of the filter. Thus, as described herein, an exemplary turbocharger can include various means for filtering lubricant for lubrication of a shaft bearing.

Although some exemplary methods, devices, systems, arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. A variable geometry turbocharger comprising:
   a housing that comprises a bore for a turbocharger shaft and a piston casing for a piston;
   a variable geometry unit for adjusting exhaust flow to a turbine wheel;
   oil flow paths defined by the housing wherein the oil flow paths comprise a path directed to the bore and paths directed to the piston casing for control of the variable geometry unit;

an oil control valve disposed at least partially in the housing wherein the oil control valve comprises a stem for controlling oil flow in the oil flow paths to the piston casing to thereby control the variable geometry unit; and an oil filter positioned, within the housing, adjacent the stem of the oil control valve to filter oil at a common portion of the oil flow path to the bore and the oil flow paths to the piston casing.

2. The turbocharger of claim 1 wherein the oil filter comprises a replaceable oil filter, replaceable via removal of the oil control valve from the housing.

3. The turbocharger of claim 1 wherein the housing comprises a center housing disposed between a compressor housing and a turbine housing.

4. The turbocharger of claim 1 further comprising the piston disposed in the housing wherein oil flow causes movement of the piston to thereby control the variable geometry unit.

5. A turbocharger center housing for a variable geometry turbocharger, the center housing comprising:
- a bore for a turbocharger shaft;
- a piston casing for a piston of a variable geometry unit of a variable geometry turbocharger;
- a fluid port defined by the turbocharger center housing;
- a fluid path from the fluid port to the bore;
- fluid paths from the fluid port to the piston casing;
- a control valve that comprises a valve stem disposed at least partially in the turbocharger center housing to thereby control fluid flow in the fluid paths from the fluid port to the piston casing of the turbocharger center housing; and
- a fluid filter disposed within the turbocharger center housing, on the valve stem, to filter fluid in the fluid path between the fluid port and a fluid inlet port of the valve stem to thereby filter fluid directed from the fluid inlet port to the fluid path to the bore and to thereby filter fluid directed from the fluid inlet port to the fluid paths to the piston casing for control of a variable geometry unit of the variable geometry turbocharger.

6. The turbocharger center housing of claim 5 further comprising the piston wherein the control valve controls fluid flow to the piston.

7. The turbocharger center housing of claim 6 wherein movement of the piston allows a variable geometry unit to adjust exhaust flow to a turbine wheel.

8. The turbocharger center housing of claim 5 further comprising an actuator for actuating the control valve.

9. The turbocharger center housing of claim 8 wherein the actuator comprises an electronic actuator.

10. An assembly for a variable geometry turbocharger, the assembly comprising:
- a turbocharger center housing that comprises a bore for a turbocharger shaft, a piston casing for a piston of a variable geometry unit of a variable geometry turbocharger, a lubricant port, a lubricant path from the lubricant port to the bore and lubricant paths from the lubricant port to the piston casing;
- a lubricant control valve that comprises a stem having one or more inlet orifices and orifices for controlling lubricant flow in the lubricant paths from the lubricant port to the piston casing, the stem seated at least partially in the turbocharger center housing; and
- a lubricant filter disposed within the turbocharger center housing, the lubricant filter positioned adjacent the stem of the lubricant control valve to filter lubricant entering an inlet orifice of the valve stem to thereby filter lubricant directed from the inlet orifice to the lubricant path to the bore and to thereby filter lubricant fluid directed from the inlet orifice to the lubricant paths to the piston casing for control of the variable geometry unit.

11. The assembly of claim 10 wherein the lubricant filter comprises a replaceable lubricant filter.

12. The assembly of claim 11 wherein removal of the lubricant control valve stem from the turbocharger center housing allows for replacement of the replaceable lubricant filter.

13. The assembly of claim 10 wherein the lubricant filter comprises an annular shape.

14. The assembly of claim 10 wherein the lubricant filter is disposed on the stem of the lubricant control valve.

15. The assembly of claim 10 further comprising the variable geometry unit for adjusting exhaust flow to a turbine wheel.

16. The assembly of claim 10 further comprising an electronic actuator for actuating the control valve.

* * * * *